United States Patent
Koyano

(10) Patent No.: US 8,351,068 B2
(45) Date of Patent: Jan. 8, 2013

(54) INFORMATION PROCESSING APPARATUS AND CONTROL METHOD THEREOF, COMPUTER PROGRAM, AND INFORMATION PROCESSING SYSTEM

(75) Inventor: Hiroki Koyano, Sagamihara (JP)

(73) Assignee: Canon Kabushiki Kaisha (JP)

( * ) Notice: Subject to any disclaimer, the term of this patent is extended or adjusted under 35 U.S.C. 154(b) by 403 days.

(21) Appl. No.: 12/037,752

(22) Filed: Feb. 26, 2008

(65) Prior Publication Data

US 2009/0002749 A1 Jan. 1, 2009

(30) Foreign Application Priority Data

Jun. 26, 2007 (JP) ................................. 2007-168084

(51) Int. Cl.
- G06K 15/00 (2006.01)
- G06K 15/02 (2006.01)
- G06F 3/12 (2006.01)
- G06G 5/00 (2006.01)

(52) U.S. Cl. ...................... 358/1.18; 358/1.11; 358/1.12; 358/1.13; 358/1.16; 345/629

(58) Field of Classification Search .................... 358/1.6, 358/2.1, 3.24, 113, 1.15, 1.12, 1.18, 450; 345/629, 632, 634, 641
See application file for complete search history.

(56) References Cited

U.S. PATENT DOCUMENTS

| | | | | |
|---|---|---|---|---|
| 5,982,994 A * | 11/1999 | Mori et al. | ................... | 358/1.15 |
| 6,292,267 B1 * | 9/2001 | Mori et al. | ................... | 358/1.15 |
| 6,447,184 B2 * | 9/2002 | Kimura et al. | ................ | 400/578 |
| 6,501,561 B2 * | 12/2002 | Hayashi | ....................... | 358/1.18 |
| 6,650,433 B1 * | 11/2003 | Keane et al. | .................. | 358/1.15 |
| 6,728,000 B1 * | 4/2004 | Lapstun et al. | ............... | 358/1.15 |
| 6,939,063 B2 * | 9/2005 | Bussell | ......................... | 400/103 |
| 7,145,670 B2 * | 12/2006 | Keane et al. | .................. | 358/1.13 |
| 7,172,113 B2 * | 2/2007 | Olenick et al. | ................ | 235/380 |
| 7,307,741 B2 * | 12/2007 | Antinora | ...................... | 358/1.12 |
| 7,821,666 B2 * | 10/2010 | Double | ......................... | 358/1.18 |
| 2001/0053304 A1 * | 12/2001 | Noda | ............................ | 400/578 |
| 2004/0120011 A1 * | 6/2004 | Double | ......................... | 358/1.18 |
| 2006/0288269 A1 * | 12/2006 | Oppenlander et al. | ........ | 715/505 |

FOREIGN PATENT DOCUMENTS

| | | |
|---|---|---|
| JP | 2004-157834 A | 6/2004 |
| JP | 2006-252299 A | 9/2006 |

OTHER PUBLICATIONS

Office Action issued in corresponding Korean Patent Application No. 10-2008-0016912 dated Sep. 29, 2009.

* cited by examiner

Primary Examiner — Twyler Haskins
Assistant Examiner — Jonathan Beckley
(74) Attorney, Agent, or Firm — Rossi, Kimms & McDowell LLC

(57) ABSTRACT

The apparatus transmits first image data indicating form contents and setting information associated with the print sheet on which the form contents are printed in advance to a server managing data associated with the overlay-print process, for registration by the server. When an execution instruction of the overlay-print process is received, and the apparatus generates second image data of the image to be overlaid and printed on the print sheet used in the overlay-print process, generates associated information indicating association between a print attribute designated for the overlay-print process that uses the second image data, and transmits the second image data and the associated information to the server.

11 Claims, 15 Drawing Sheets

| DEVICE NAME | PAPER FEEDING UNIT | FORM |
|---|---|---|
| DEVICE A | CASSETTE 1 | FORM A |
| | CASSETTE 2 | FORM B |
| | CASSETTE 3 | FORM C |
| | CASSETTE 4 | FORM D |

| GROUP NAME | USER NAME |
|---|---|
| GROUP A | USER 1<br>USER 2<br>USER 3 |
| GROUP B | USER 4<br>USER 5 |

GROUP SETTING | PAPER FEEDING UNIT SETTING

[DELETE GROUP]
[DELETE MEMBER]

GROUP NAME :
[                    ]   [CREATE GROUP]

UNREGISTERED USER TO GROUP :
USER 6
USER 7
USER 8

[ADD MEMBER]

1202

GROUP SETTING | PAPER FEEDING UNIT SETTING

GROUP NAME :                                GROUP A ▽

AVAILABLE PAPER FEEDING UNIT :

CASSETTE 1
CASSETTE 2

[ADD ←]
[← DELETE]

MANUAL INSERT TRAY
CASSETTE 3

─ PROCESS AFTER EXCHANGE OF PAPER CASSETTE ─
○ RE-REGISTER SHEET AND ENABLE PRINT PROCESS.
⦿ DISABLE ALL PRINT PROCESSES

STORABLE SHEET :          IMAGE :          SHEET NAME :
FORM 1-A
FORM 1-B

[DELETE]  [REGISTER]

FIG. 12

| DEVICE NAME | GROUP NAME | USER NAME | PAPER FEEDING UNIT | FORM | EXCHANGE |
|---|---|---|---|---|---|
| DEVICE A | GROUP A | USER 1 | CASSETTE 1 | FORM 1-A | RE-REGISTRATION |
| | | USER 2 | | FORM 1-B | |
| | | USER 3 | CASSETTE 2 | FORM 2-A | RE-REGISTRATION |
| | | | | FORM 2-B | |
| | | | | FORM 2-C | |
| | | | MANUAL INSERT | | ERROR |

☐ QUOTATION  ☐ ____

WE QUOTE AS FOLLOWS.

| ARTICLE NAME | AMOUNT |
|---|---|
|  |  |
|  |  |
|  |  |
| TOTAL AMOUNT |  |

XXX TRADING TOKYO BRANCH
012-345-6789

☐ QUOTATION (COPY FOR HEAD OFFICE)  ☐ ____

| ARTICLE NAME | AMOUNT |
|---|---|
|  |  |
|  |  |
|  |  |
| TOTAL AMOUNT |  |

REMARKS OF HEAD OFFICE

☐ QUOTATION (COPY FOR RETAILER)  ☐ ____

| ARTICLE NAME | AMOUNT |
|---|---|
|  |  |
|  |  |
|  |  |
| TOTAL AMOUNT |  |

RETAILER'S NAME
CONTACT PERSON NAME

+

502

No.0001                           YYY CO., LTD.

ARTICLE A      ¥10,000
ARTICLE B      ¥20,000
ARTICLE C      ¥30,000

QUOTATION

No.0001  YYY CO., LTD.

WE QUOTE AS FOLLOWS.

| ARTICLE NAME | AMOUNT |
|---|---|
| ARTICLE A | ¥10,000 |
| ARTICLE B | ¥20,000 |
| ARTICLE C | ¥30,000 |
| TOTAL AMOUNT | ¥60,000 |

XXX TRADING TOKYO BRANCH
012-345-6789

QUOTATION (COPY FOR HEAD OFFICE)

No.0001  YYY CO., LTD.

| ARTICLE NAME | AMOUNT |
|---|---|
| ARTICLE A | ¥10,000 |
| ARTICLE B | ¥20,000 |
| ARTICLE C | ¥30,000 |
| TOTAL AMOUNT | ¥60,000 |

REMARKS OF HEAD OFFICE

QUOTATION (COPY FOR RETAILER)

No.0001  YYY CO., LTD.

| ARTICLE NAME | AMOUNT |
|---|---|
| ARTICLE A | ¥10,000 |
| ARTICLE B | ¥20,000 |
| ARTICLE C | ¥30,000 |
| TOTAL AMOUNT | ¥60,000 |

RETAILER'S NAME
CONTACT PERSON NAME

503

INFORMATION PROCESSING APPARATUS AND CONTROL METHOD THEREOF, COMPUTER PROGRAM, AND INFORMATION PROCESSING SYSTEM

BACKGROUND OF THE INVENTION

1. Field of the Invention

The present invention relates to an information processing apparatus which generates information required to manage an overlay print process for overlaying and printing an image on a print sheet on which form contents are printed in advance, a control method thereof, a computer program and an information processing system.

2. Description of the Related Art

Nowadays, business organizations draw growing interest on internal control, and demand necessity of visualization of business processes. In such an environment, a print (overlay print) process which overlays a predetermined form and data in a text format (field data) defined for each page is used. As for the form, a paper sheet (preprinted sheet) on which its contents (form contents) are printed in advance is used. This overlay print process handles confidential information and personal information very often, and the importance on thorough control activities is growing in terms of prevention of errors and corruptions.

In the related art, for the purpose of suppressing information leakage and illicit use with respect to printed products, a print server holds, together with log information, print data processed by a printing apparatus such as a printer, MFP, or the like in the form of text or image data. Then, it is a common practice to introduce a system which, if perchance information has been leaked, searches print data saved in the print server to specify a leak source (see Japanese Patent Laid-Open No. 2006-252299).

However, when a printed product overlay printed on the preprinted sheet is duplicated or leaked for some cause, the printer server in the conventional system saves only information of the field data. For this reason, for example, a very long time needs to be spent to search for and specify the time, person, and place of overlay printing of a printed product to which such a problem is traced back.

This is, for example, for the following reasons.

(1) Since the print server does not save any information of a form (pre-printed sheet), a search process based on form information cannot be made.

(2) Since there are many types of forms that use identical field data, printed products cannot be sufficiently limited by the search process based only on the field data information.

(3) Visual checking of printed products by the user not only lacks certitude but also is impossible in practice.

FIGS. 14A and 14B show examples of a plurality of different forms using identical field data, and overlay print results. FIG. 14A shows identical field data 502 to be applied to a plurality of different forms 501. In the conventional arrangement, using this field data 502 for each of the plurality of different forms 501, overlay print results 503 in which the field data 502 are printed on the respective forms can be obtained.

SUMMARY OF THE INVENTION

The present invention has been made to solve the aforementioned problems, and the present invention provides an information processing apparatus which can easily specify information associated with previous illicit overlay printing, a control method thereof, and a computer program.

According to one aspect of the present invention, an information processing apparatus for generating information required to manage an overlay print process which overlays and prints an image on a print sheet on which form contents are printed in advance, the apparatus comprises:

a first transmission unit configured to transmit first image data indicating the form contents and setting information associated with the print sheet on which the form contents are printed in advance to a server, which manages data associated with the overlay print process, for registration by the server, and a second transmission unit configured to, when an execution instruction of the overlay print process is received, generate second image data of the image to be overlaid and printed on the print sheet used in the overlay print process, generate associated information indicating association between the second image data and a print attribute designated for the overlay print process that uses the second image data, and transmit the second image data and the association to the server.

According to another aspect of the present invention, a method of controlling an information processing apparatus for generating information required to manage an overlay print process which overlays and prints an image on a print sheet on which form contents are printed in advance, the method comprises:

a first transmission step of transmitting first image data indicating the form contents and setting information associated with the print sheet on which the form contents are printed in advance to a server, which manages data associated with the overlay print process, for registration by the server;

a second generation step of generating, when an execution instruction of the overlay print process is received, second image data of the image to be overlaid and printed on the print sheet used in the overlay print process, and.

a second transmission step, when an execution instruction of the overlay print process is received, of generating second image data of the image to be overlaid and printed on the print sheet used in the overlay print process, of generating associated information indicating association between the second image data and a print attribute designated for the overlay print process that uses the second image data, and of transmitting the second image data and the association to the server.

Further features of the present invention will become apparent from the following description of exemplary embodiments with reference to the attached drawings.

BRIEF DESCRIPTION OF THE DRAWINGS

FIG. 1 shows an example of a preprinted sheet and form information on which corresponding field figures are defined according to the first embodiment of the present invention;

FIG. 7 shows an example of print attributes including names of devices and feeders which store preprinted sheets according to the first embodiment of the present invention;

FIG. 11 shows exemplary operation windows used to set paper feeding units which are authorized to use for respective users, and to set preprinted sheets to be stored in the paper feeding units according to the second embodiment of the present invention;

FIG. 12 shows an exemplary operation window used to set paper feeding units and preprinted sheets available for respective users according to the second embodiment of the present invention;

FIGS. 14A and 14B show examples of a plurality of different forms that use identical field data, and overlay print results.

DESCRIPTION OF THE EMBODIMENTS

Preferred embodiments of the present invention will now be described in detail below with reference to the drawings. It should be noted that the relative arrangement of the components, the numeral expressions and numeral values set forth in these embodiments do not limit the scope of the present invention unless it is specifically stated otherwise.

The present invention relates to a print process (overlay printing) which overlays a form and data in a text format defined for each page. Especially, the present invention can easily specify the time, person, and place of overlay printing of a printed product to which a problem is traced back, when the overlay-printed product using a preprinted sheet on which the form contents are printed in advance is duplicated or leaked for some cause. Hence, the present invention can implement a printing system which can suppress information leakage and illicit use with respect to printed products, and can attain thorough internal control.

First Embodiment

A page printer such as a laser printer or the like has a function called page registration or form registration. Using this function, for example, information of frame lines and the like in a form can be registered as form information. When data in a text format (field data) is printed using this page printer, a function called page information call or form information call is used. In this way, the pre-registered form information and the data in the text format can be printed to overlap each other. Such overlap printing is defined as overlay printing.

A form (form information) used in overlay printing is generally created using a dedicated form information design system. On form information, two types of figures are set. One figure (form figure) is fixedly displayed at a designated position on a form, and does not depend on any data. The other figure (field figure) is displayed at a designated position on the form in accordance with settings (output format) of a format and size of field data to be received.

Figure 1:
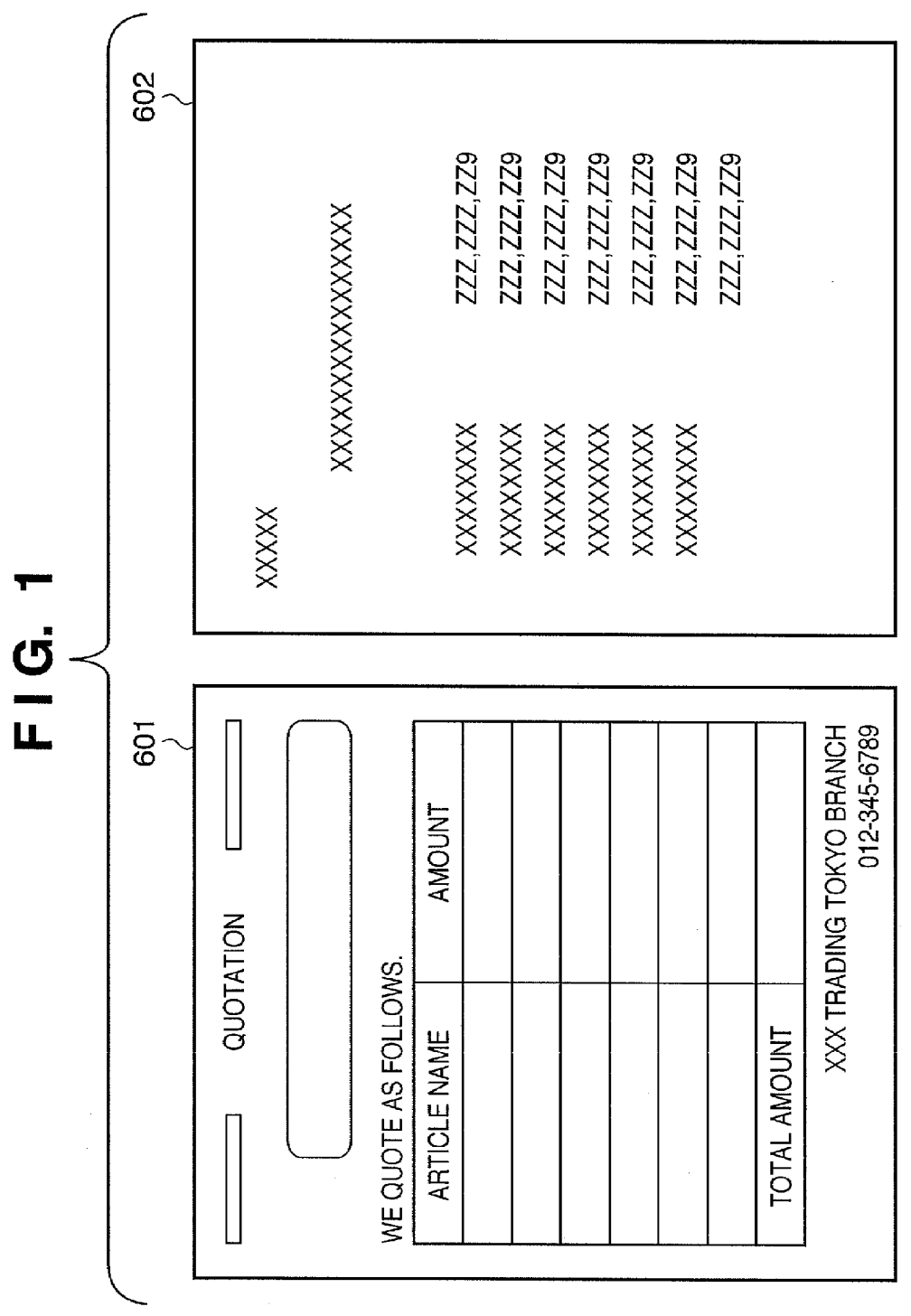

Upon execution of overlay printing using a sheet (preprinted sheet) on which form figure parts of form information are printed in advance like in the present invention, field figures need only be defined and created for form information. FIG. 1 shows an example of a preprinted sheet 601 used in overlay printing, and form information 602 on which corresponding field figures are defined and created.

The arrangement of a computer system (printing system) which implements a form information design system and overlay print control system according to the present invention will be described below with reference to FIG. 2.

Figure 2:
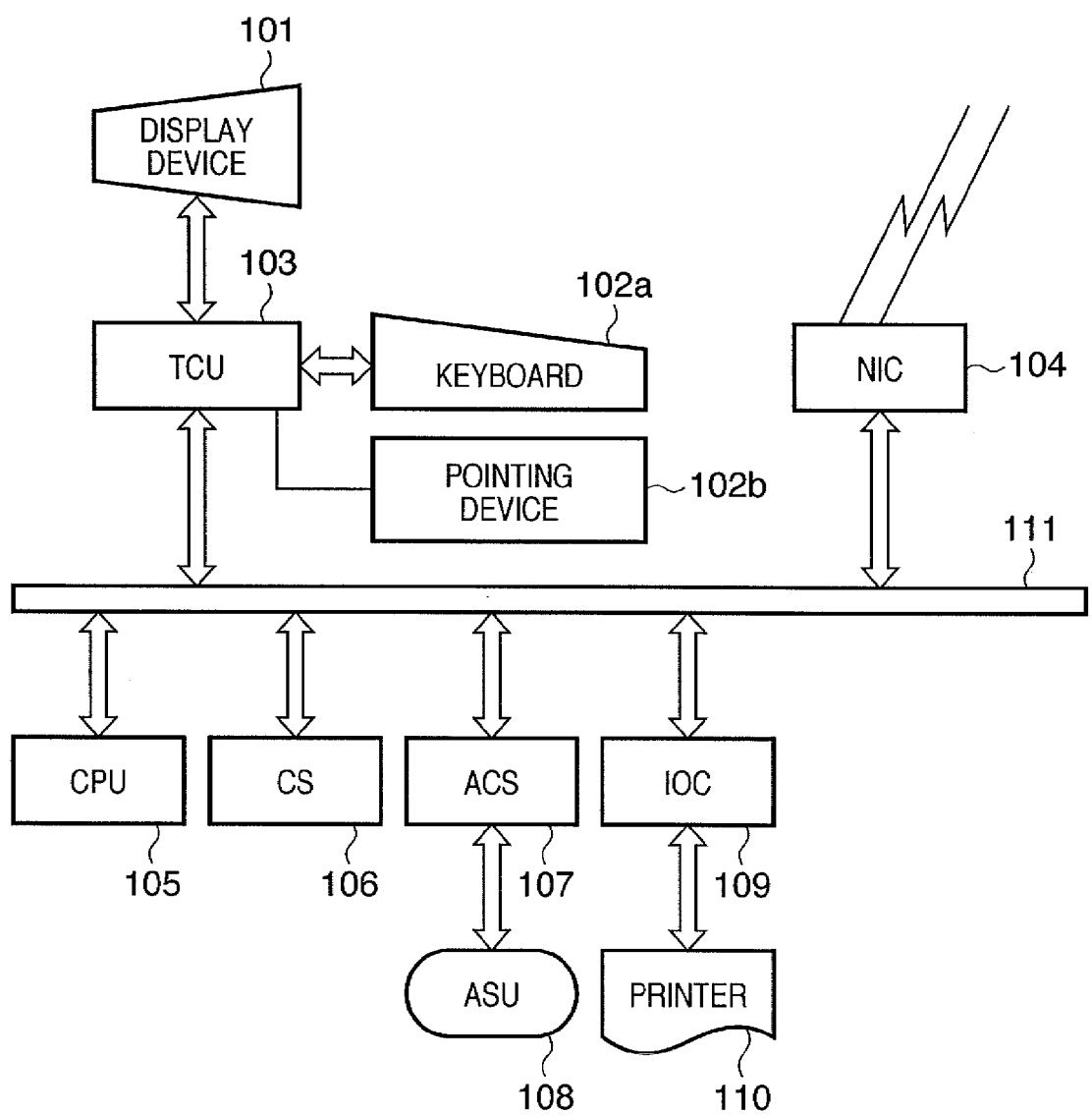
FIG. 2 is a block diagram showing the arrangement of a computer system which implements a form information design system and overlay print control system according to the first embodiment of the present invention.

FIG. 2 is a block diagram showing the arrangement of a computer system which implements a form information design system and overlay print control system according to the first embodiment of the present invention.

Referring to FIG. 2, a CPU 105 which controls the overall system controls the operations of various components which configure the system according to control programs stored in a Central Storage (CS) 106. The CS 106 also provides a memory area used to store and execute application programs, which are loaded from an Auxiliary Storage Unit (ASU) 108 via an Auxiliary Storage Controller (ASC) 107. The memory area of this CS 106 also stores programs required to implement a form information design system and overlay printing system.

Control programs and various application programs on the CS 106 are manipulated according to instructions from the following two devices. The first device is an operator console which is configured by a display device 101, keyboard 102*a*, pointing device 102*b*, and Terminal Control Unit (TCU) 103. The second device is a Network Interface Controller (NIC) 104 which fetches, into this computer system, instruction information from an external computer system connected via a network such as a LAN, WAN, or the like.

A printer 110 is connected to this computer system via an Input Output Controller (IOC) 109. The printer 110 registers, in advance, form information input from the computer system in its internal memory. The printer 110 generates an overlay pattern by overlaying data in the text format input from the computer system, and a form pattern generated based on the form information registered in advance in the memory, thus implementing overlay printing.

Note that a system bus 111 is a path used to exchange data and program instructions among various components, i.e., the TCU 103, NIC 104, CPU 105, CS 106, ASC 107, and IOC 109.

The functional arrangement of a form information design system will be described below with reference to FIG. 3.

Figure 3:
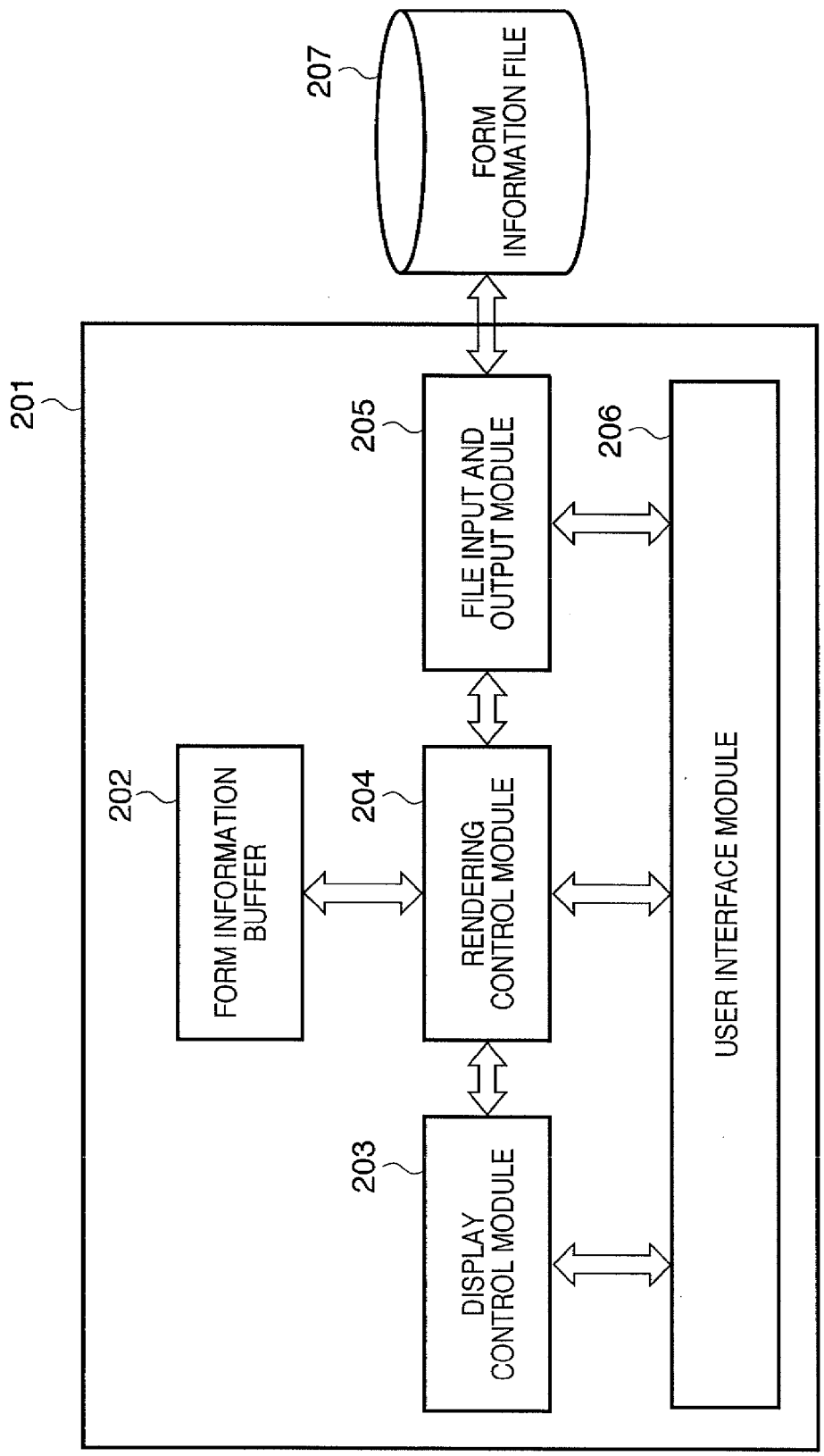
FIG. 3 is a block diagram showing the functional arrangement of a form information design system according to the first embodiment of the present invention.

FIG. 3 is a block diagram showing the functional arrangement of the form information design system according to the first embodiment of the present invention.

Referring to FIG. 3, reference numeral 201 denotes a form information design system. The form information design system 201 resides on the CS 106 (FIG. 2) when it is used. The CPU 105 controls a form information buffer 202, display control module 203, rendering control module 204, and file input and output module 205 based on a user interface module 206 in the form information design system 201.

Note that the user interface module 206 is implemented by a whole control program; the display control module 203, a display control program; the rendering control module 204, a rendering control program; and the file input and output module 205, a file input and output control program.

The CPU 105 receives various instructions (a setting instruction of the form information design system, form information creation instruction, and the like) input using, for example, the pointing device 102b via the TCU 103, based on the display control module 203. The CPU 105 interprets the various received instructions based on the user interface module 206, and issues processing requests as internal instructions to the rendering control module 204 and file input and output module 205.

The CPU 105 transmits the processing results of the rendering control module 204 and file input and output module 205 based on the user interface module 206, and displays the processing results on the display device 101 based on the display control module 203.

The display control module 203 is implemented by a display control program. The display control module 203 displays, on the display device 101, a form pattern based on form information which is being currently designed on the form information buffer 202 via the rendering control module 204. The display control module 203 receives various instructions input using the keyboard 102a and pointing device 102b.

The rendering control module 204 is implemented by a rendering control program. The rendering control module 204 manages the form information buffer 202, and inputs and outputs all created form information elements to and from the form information buffer 202. The rendering control module 204 transfers form information elements to the display control module 203 and file input and output module 205 in two ways in accordance with instructions from the user interface module 206.

The file input and output module 205 is implemented by a file input and output control program. The file input and output module 205 writes and reads out form information, which is being currently designed on the form information buffer 202 via the rendering control module 204, in and from a form information file 207 assured on the ASU 108, based on instructions of the user interface module 206. The file input and output unit 205 also reads out and writes the form information file 207 via the rendering control module 204 based on instructions of the user interface module 206.

The functional arrangement of the overlay printing system will be described below with reference to FIG. 4.

Figure 4:
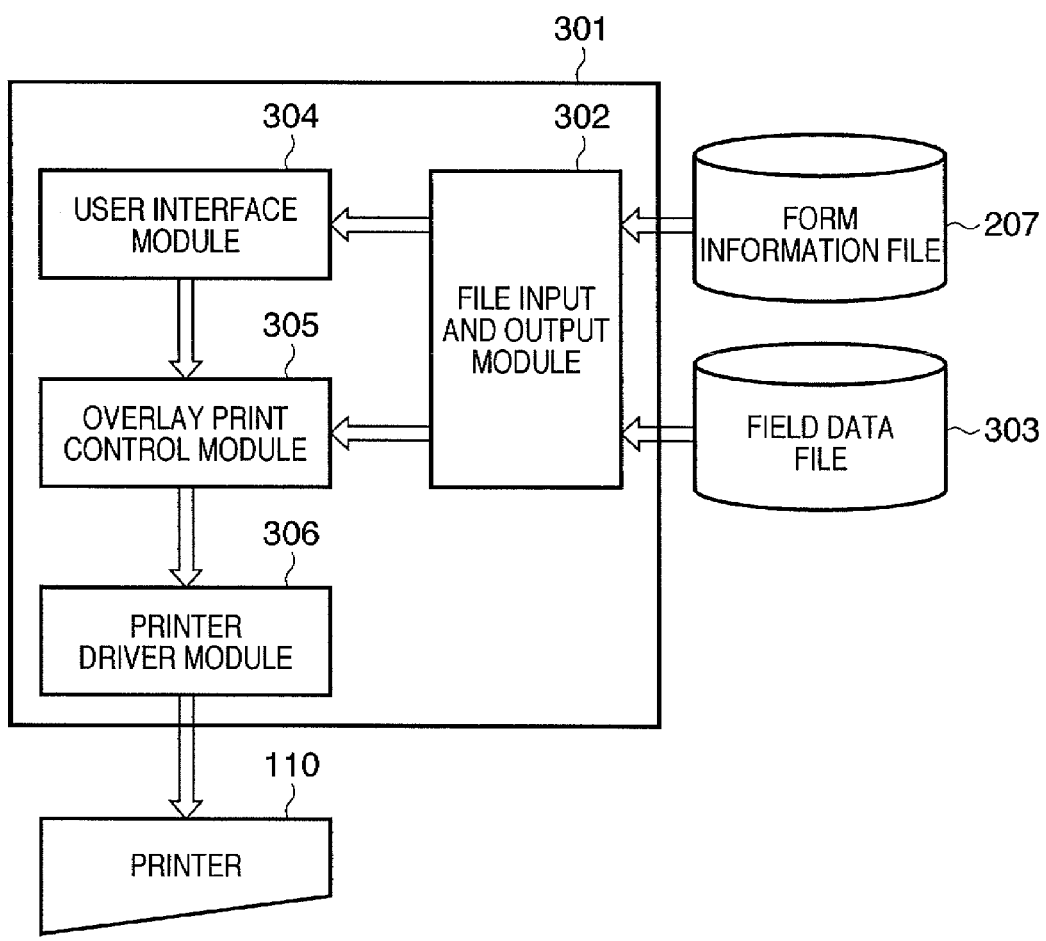
FIG. 4 is a block diagram showing the functional arrangement of an overlay printing system according to the first embodiment of the present invention.

FIG. 4 is a block diagram showing the functional arrangement of an overlay printing system according to the first embodiment of the present invention.

Referring to FIG. 4, reference numeral 301 denotes an overlay printing system. The overlay printing system 301 resides on the CS 106 (FIG. 2) when it is used. The CPU 105 controls a file input and output module 302, user interface module 304, and printer driver module 306 based on an overlay print control module 305 in the overlay printing system 301.

Note that the overlay print control module 305 is implemented by a whole control program; the file input and output module 302, a file input and output control program; the user interface module 304, a control program; and the printer driver module 306, a printer control program.

The user interface module 304 is implemented by a control program. The user interface module 304 receives form information files 207 and field data files 303 in the ASU 108 via the file input and output module 302. The user interface module 304 displays a list of form information file names and field data file names of the received files on the display device 101. The user interface module 304 receives selection instruction information (form information file name, field data file name, and the like) designated by the user using the keyboard 102a or pointing device 102b, and outputs it to the file input and output module 302.

The file input and output module 302 is implemented by a file input and output program. The file input and output module 302 receives the selection instruction information input via the user interface module 304. The file input and output module 302 reads out form information of the form information file 207 and designated data from the field data file 303 based on the received selection instruction information, and outputs the readout data to the overlay print control module 305.

The overlay print control module 305 is implemented by a whole control program. The overlay print control module 305 outputs the form information of the form information file 207, received via the file input and output module 302, to the printer 110 via the printer driver module 306, and registers it in the printer 110. The overlay print control module 305 interprets data in the text format received via the file input and output module 302 to generate intermediate data, and outputs the intermediate data to the printer driver module 306. This intermediate data is data which has undergone processes so that, for example, the printer driver module 306 can easily generate bitmap data.

The system arrangement of client and server computers, which execute the overlay print process in a network environment, and a print server, which saves (registers) and manages print data printed in the overlay print process will be described below with reference to FIG. 5.

Figure 5:
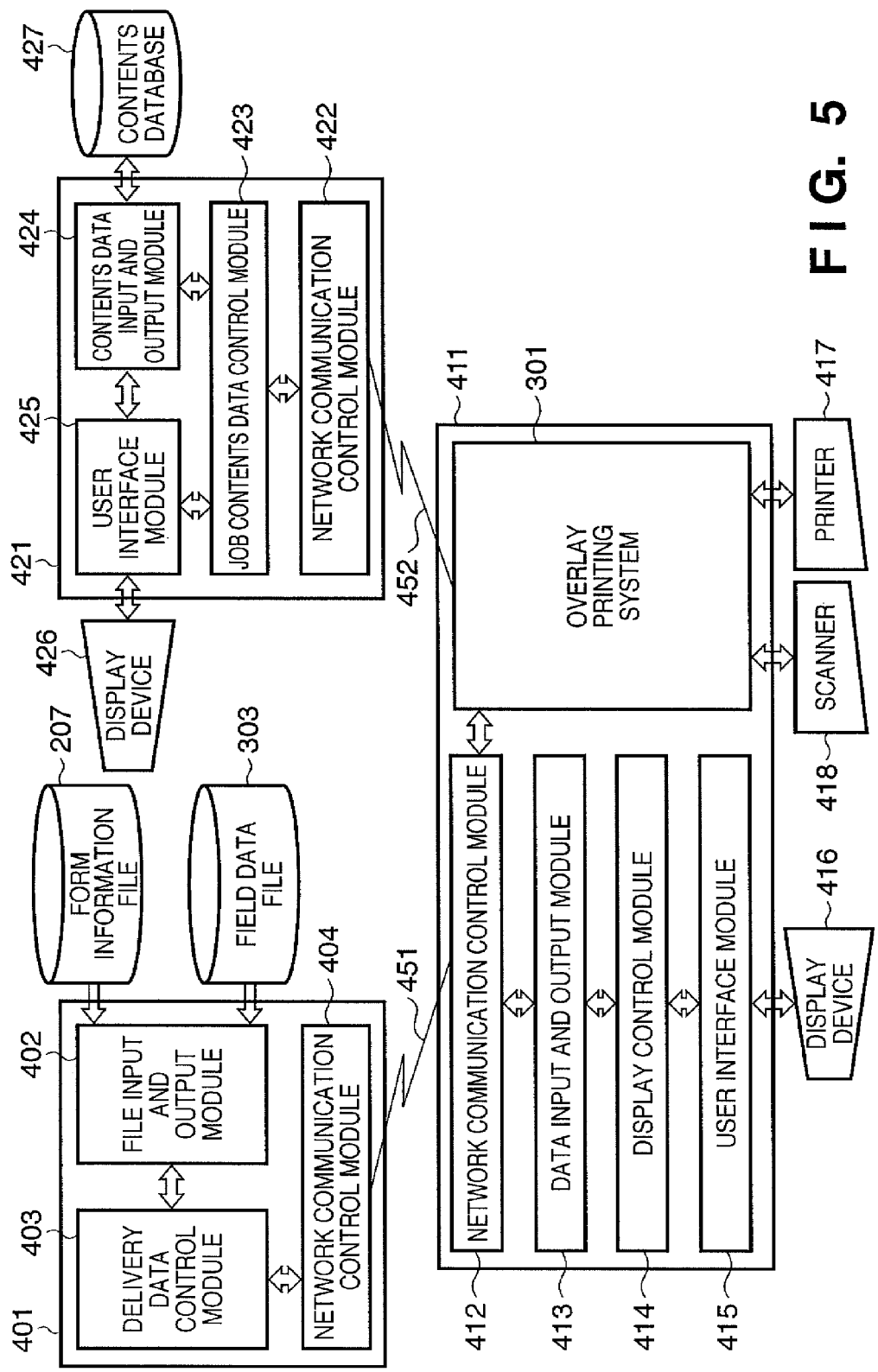
FIG. 5 is a block diagram showing a computer system with a network configuration according to the first embodiment of the present invention.

FIG. 5 is a block diagram showing a computer system with the network configuration according to the first embodiment of the present invention.

Note that the same reference numerals in FIG. 5 denote components common to those in FIG. 4, and a detailed description thereof will not be given.

Referring to FIG. 5, reference numeral 401 denotes an information processing apparatus as a server. Reference numeral 411 denotes an information processing apparatus as a client. The client 411 inputs and outputs instructions of the overlay print process and required data to and from the server 401. Especially, the client 411 generates information required to manage a history of the overlay print process.

Reference numeral 421 denotes an information processing apparatus as a print server, which saves (registers) and manages data associated with the overlay print process. Note that the data associated with the overlay print process include image data of print sheets used in the overlay print process, print attributes used in the overlay print process, field data used in the overlay print process, and the like.

Note that the hardware arrangements of these information processing apparatus (server 401, client 411, and print server 421) are compliant with that shown in FIG. 2. The server 401, client 411, and print server 421 are implemented by, for example, a Web server-client system. Therefore, the server 401 and print server 421 mount a Web server function, and the client 411 mounts a browser function required to browse Web pages.

Based on a user's operation, a user interface module 415 on the client 411 issues an overlay print process request, and transmits it to a display control module 414. The display control module 414 executes status display of issued contents, an issued state, and the like on a display device 416 in accordance with the received request, and transmits that request to a data input and output module 413. The data input and output module 413 transmits that request to a network communication control module 412. The network communication control module 412 transmits the received request to the server 401 via a network 451.

In the server 401, a network communication control module 404 receives the overlay print process request from the client 411 via the network 451. The network communication control module 404 transmits the received request to a delivery data control module 403. The delivery data control module 403 interprets the contents of the received request, and transmits the interpretation result to a file input and output module 402. The file input and output module 402 calls a form information file 207 and field data file 303 required for the overlay print process based on the received interpretation result, and transmits them to the delivery data control module 403.

The delivery data control module 403 transmits the received form information file 207 and field data file 303 to the network communication control module 404. The network communication control module 404 asynchronously transmits the received form information file 207 and field data file 303 to the client 411 via the network 451.

In the client 411, the network communication control module 412 receives the form information file 207 and field data file 303 from the server 401 via the network 451. The network communication control module 412 transmits the received form information file 207 and field data file 303 to the overlay printing system 301.

The overlay printing system 301 executes an overlay print process using a printer 417 based on the received form information file 207 and field data file 303. In the overlay print process, log information, and text and image data of the overlay print process, which are generated by the printer driver module 306 in the overlay printing system 301, are transmitted to the print server 421 via a network 452. Further, client 411 is connected to a scanner 418 vie a network. The scanner 418 has a function for reading a document sheet and generating image data.

In the print server 421, a network communication control module 422 receives the log information, and text and image data from the client 411 via the network 452. The network communication control module 422 transmits the log information, and text and image data to a job contents data control module 423. The job contents data control module 423 processes the received log information, and text and image data as contents data. The job contents data control module 423 transmits the contents data to a contents data input and output module 424. The contents data input and output module 424 stores and saves (registers) the received contents data in a contents database 427.

On the other hand, upon execution of a search process for printed products printed by the previously executed overlay print processes, the user inputs search conditions via a user interface module 425. The user interface module 425 transmits the input search conditions to the contents data input and output module 424. The contents data input and output module 424 searches the contents database 427 for contents data which match the received search condition, and transmits the search result to the user interface module 425. The user interface module 425 outputs the received search result to a display device 426. In step 101, the scanner connected to the scanner 411 reads a preprinted sheet used for overlay print to generate image data.

Note that the search process for printed products printed by the previously executed overlay print processes can also be executed when the client 411 issues a search instruction to the print server 421.

The processing to be executed by the printing system according to the first embodiment will be described below with reference to FIG. 6.

Figure 6:
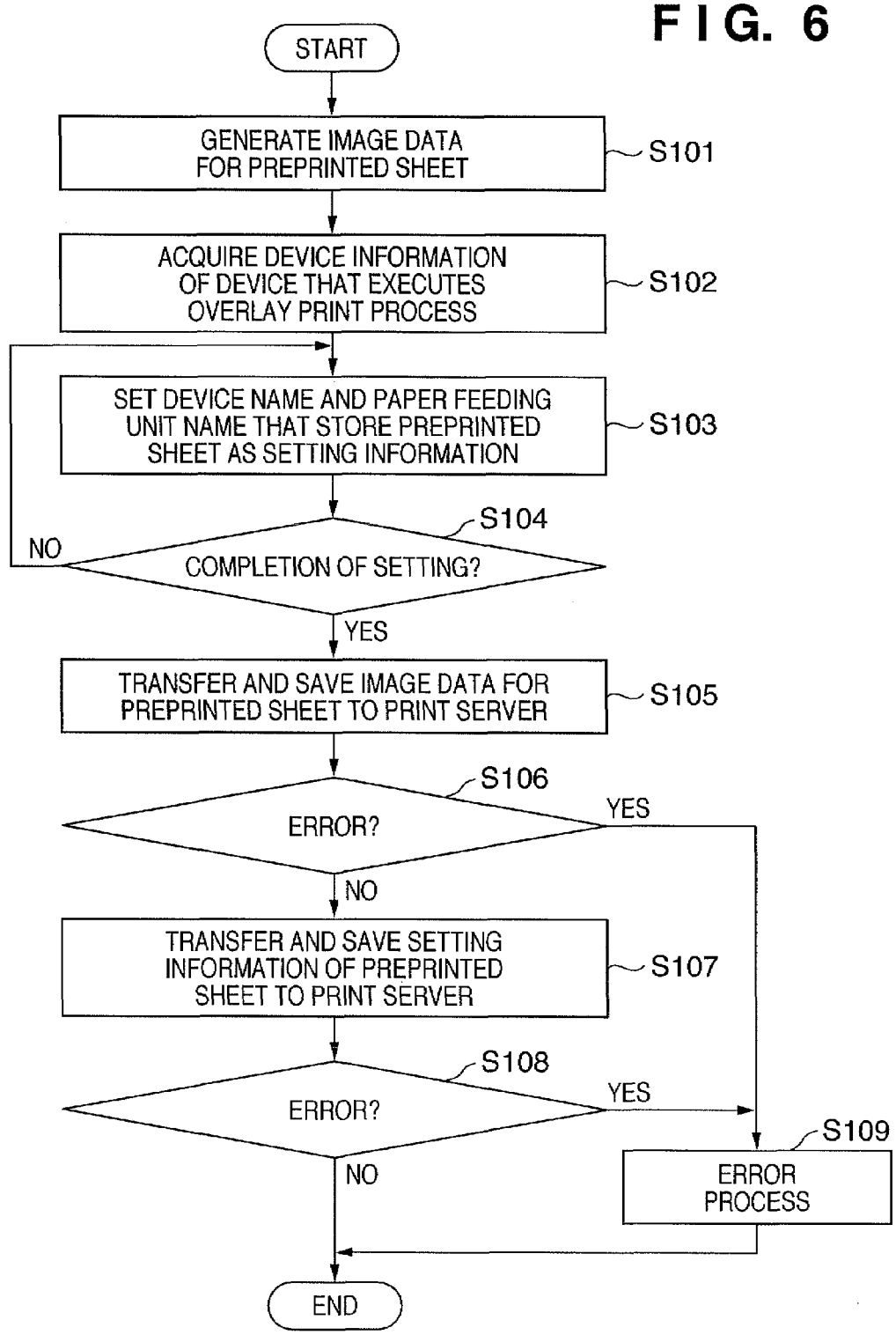
FIG. 6 is a flowchart showing the processing to be executed by the printing system according to the first embodiment of the present invention.

FIG. 6 is a flowchart showing the processing to be executed by the printing system according to the first embodiment of the present invention.

The flowchart shown in FIG. 6 shows the processing which generates image data for preprinted sheets, acquires and sets the device name of a device used in the overlay print process and the paper feeding unit names that store preprinted sheets, and transfers and saves (registers) these pieces of information to the print server. A control program that implements this flowchart resides in the client 411 shown in FIG. 5. The processing shown in FIG. 6 is executed when the control program is launched at the time of making required inputs via the display device 416 to implement the respective components in the client 411.

Initially, the CPU 105 executes generation of image data (form image data (first image data)) for preprinted sheets used in the overlay print process (step S101). That is, the CPU 105 executes a first generation process for generating first image data. When a device which executes the overlay print process has a plurality of paper feeding units, and can mount a plurality of types of preprinted sheets, the process in step S101 is executed for these types.

The CPU 105 sends an inquiry about device information (more specifically, the device name, the configuration of paper feeding units of a device, and the like) of a device used in the overlay print process to the device (printer 417), and acquires the device information (step S102).

Note that the device (printer 417) can manage information such as the device name, the configuration of the paper feeding units of the device, the presence/absence of exchange of the paper feeding units, and the like as its own device information, and can output the device information to an external device as needed.

The CPU 105 sets the device name and paper feeding unit names which store preprinted sheets as setting information based on the device information acquired in step S102 (step S103). FIG. 7 shows an example of the setting information including the device name and paper feeding unit names that store preprinted sheets, and the type names (form names) of preprinted sheets.

The CPU 105 continues the process in step S103 until the setting of the setting information is completed. The CPU 105 checks if the setting is complete (step S104). If the setting is not complete yet (NO in step S104), the process returns to step S103. On the other hand, if the setting is complete (YES in step S104), the process advances to step S105.

The CPU 105 transfers and saves (registers) the image data (first image data) for preprinted sheets generated in step S101 to the print server 421 (step S105). In other words, the CPU 105 executes a first transmission process for transmitting the first image data to the print server 421 so as to register the first image data in the print server 421. The print server 421 executes a first registration process for registering the received first image data in its internal storage medium (memory).

Note that each image data is appended with the type name (form name) of corresponding preprinted sheets as additional information. With this information, the print server 421 can manage the previously received image data for preprinted sheets and the setting information in association with each other. Registering various data in the print server 421 by the client 411 means that the print server 421 registers target data in its own storage medium in response to a registration instruction from the client 411.

The CPU 105 checks if an error has occurred in the process in step S105 (step S106). If the CPU 105 determines that an error has occurred (YES in step S106), it executes an error process (step S109). Note that the error process includes a process for outputting an error message to the display device 416 or using the printer 417, and so forth.

On the other hand, if the CPU 105 determines that no error has occurred (NO in step S106), it transfers and saves (registers) the setting information set in step S103 to the print server 421 (step S107). In other words, the CPU 105 executes a second transmission process for transmitting the setting information to the print server 421 to register it in the print server 421. The print server 421 executes a second registration process for registering the received setting information in its internal storage medium (memory).

The CPU 105 checks if an error has occurred in the process in step S107 (step S108). If the CPU 105 determines that an error has occurred (YES in step S108), it executes an error process (step S109). On the other hand, if the CPU 105 determines that no error has occurred (NO in step S108), it ends the processing.

The overlay print process using preprinted sheets will be described below with reference to FIG. 8.

Figure 8:
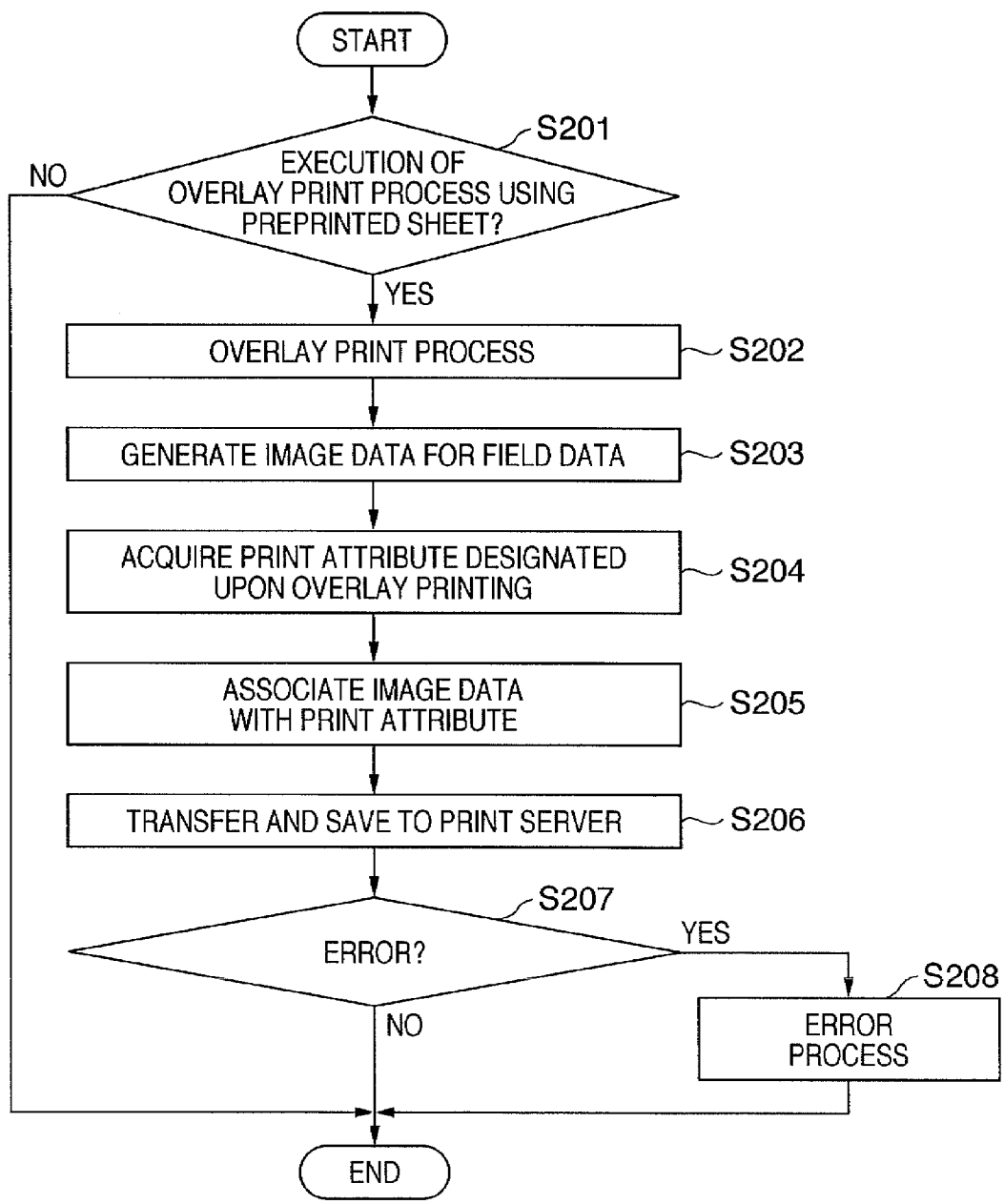
FIG. 8 is a flowchart showing the overlay print process using preprinted sheets according to the first embodiment of the present invention.

FIG. 8 is a flowchart showing the overlay print process using preprinted sheets according to the first embodiment of the present invention.

A control program that implements this flowchart resides in the client 411 shown in FIG. 5. The processing shown in FIG. 8 is executed when the control program is launched at the time of making required inputs via the display device 416 so as to implement various components in the client 411.

Initially, the CPU 105 checks based on an instruction input from the user if the input instruction is an overlay print execution instruction using preprinted sheets (step S201). If the CPU 105 determines that the input instruction is not an overlay print execution instruction (NO in step S201), it ends the processing. On the other hand, if the CPU 105 determines that the input instruction is an overlay print execution instruction (YES in step S201), it executes an overlay print process (step S202).

In the overlay print process, the CPU 105 generates image data (second image data) for field data processed as print data in the device (step S203). That is, the CPU 105 executes a second generation process for generating second image data of an image to be overlaid and printed on each print sheet used in the overlay print process.

In addition, the CPU 105 acquires print attributes designated for the overlay print process (step S204). Note that the print attributes are information including the device name and paper feeding unit name used in the overlay print process.

Note that the overlay print execution instruction is generated by the control program (e.g., the printer driver module 306 in the overlay printing system 301) in the client 411, and can be issued via a user interface displayed on the display device 416. The user can designate various print settings associated with the overlay print process using this user interface, and can designate the print attributes associated with the overlay print process in the print settings. When the user does not designate any print attributes, default print attributes pre-stored in the client 411 are used in the overlay print process.

The CPU 105 associates the image data generated in step S203 and the print attributes acquired in step S204 with each other (step S205). The CPU 105 transfers and saves (registers) associated information obtained by this association to the print server 421 (step S206). In other words, the CPU 105 executes a third transmission process for transmitting the associated information to the print server 421 so as to generate the associated information and to register it in the print server 421. The print server 421 executes a third registration process for registering the received associated information in its internal storage medium (memory).

Figure 9:
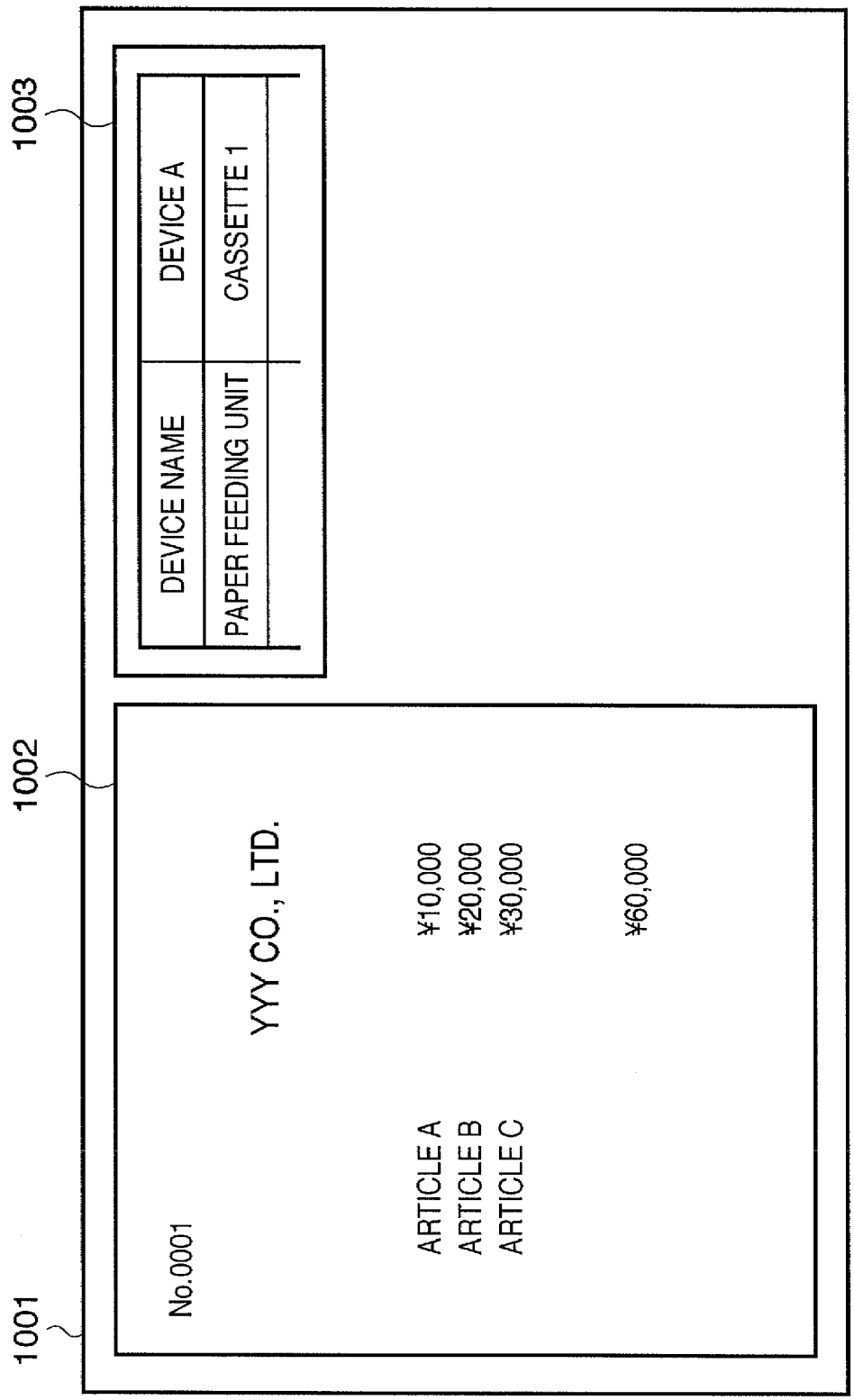
FIG. 9 shows an example of associating information according to the first embodiment of the present invention.

FIG. 9 shows an example of associated information (stylized information) indicating association between the image data with respect to the field data, and the print attributes. As shown in FIG. 9, associated information 1001 includes field data 1002 and print attributes 1003.

The CPU 105 checks if an error has occurred in the process in step S206 (step S207). If the CPU 105 determines that an error has occurred (YES in step S207), it executes an error process (step S208). If the CPU 105 determines that no error has occurred (NO in step S207), it ends the processing.

With the processing shown in FIGS. 6 and 8, the print server 421 saves (registers) and manages information associated with printed products overlay-printed using preprinted sheets. With this information, even when an overlay-printed printed product is duplicated or leaked for some cause, the preprinted sheet used in the overlay print process can be easily specified (search process) based on the information saved (registered) in the print server 421.

The print server 421 may execute this search process in response to a search instruction from the client 411, or it may execute the search process in response to a search instruction directly input to the print server 421.

In either case, image data of a preprinted sheet can be searched for and specified with reference to the setting information of the corresponding image data of the preprinted sheet based on the print attributes associated with image data for field data registered in the print server 421. That is, the search process is executed using the print attributes as the search conditions to search for and specify the image data of the preprinted sheet. The found image data of the preprinted sheet may be output as a search result onto the display device 416 of the client 411, or onto the display device 426 of the print server 421.

In this search process, the output contents of the image data of the preprinted sheet output as the search result can be controlled based on search histories such as the number of times of search execution for printed products output by the overlay print process, the number of search hits, and the like. This control may be executed by either the client 411 or the print server 421.

For example, in this control, the client 411 automatically checks if image data (overlay print result: third image data) obtained by compositing the image data for preprinted sheets (first image data) and image data for field data (second image data), which are independently managed in the print server 421, is to be generated. The client 411 displays the overlay print result on the display 416 based on the checking result.

In this way, the overlay print result intended by the user can be output onto the display device 416. Upon outputting this overlay print result, the result may be transferred to and saved (registered) in the print server 421 so as to allow re-confirmation later.

As described above, according to the first embodiment, even when a printed product is duplicated or leaked for some cause, image data for a preprinted sheet in the print server can be specified from print attribute information associated with an image for field data. For this reason, the time, person, and place of overlay printing of a printed product to which such problem is traced back can be easily identified.

The print server independently registers image data for field data and that for preprinted sheets. For this reason, after the search process for one image is executed, that for the other image is executed sequentially, thus efficiently limiting candidates.

Second Embodiment

The first embodiment has explained the arrangement in which the print server saves (registers) image data for preprinted sheets in advance, and a preprinted sheet used can be specified from image data to be generated for field data upon execution of the overlay printing.

In case of the arrangement of the first embodiment, internal control by suppressing illicit printing can be attained to some extent. However, an ill-intentioned user may illicitly exchange paper cassettes of a device before overlay printing or may use a manual insert unit of the device, thus readily executing overlay printing using sheets which are not under the control of the print server. In such a case, if illicit printing is identified later, a very long time needs to be spent until the time and person who executed such illicit printing are searched for and specified.

Hence, the second embodiment will explain an arrangement that can avoid such situation.

The processing to be executed by the printing system of the second embodiment will be described first with reference to FIG. 10.

Figure 10:
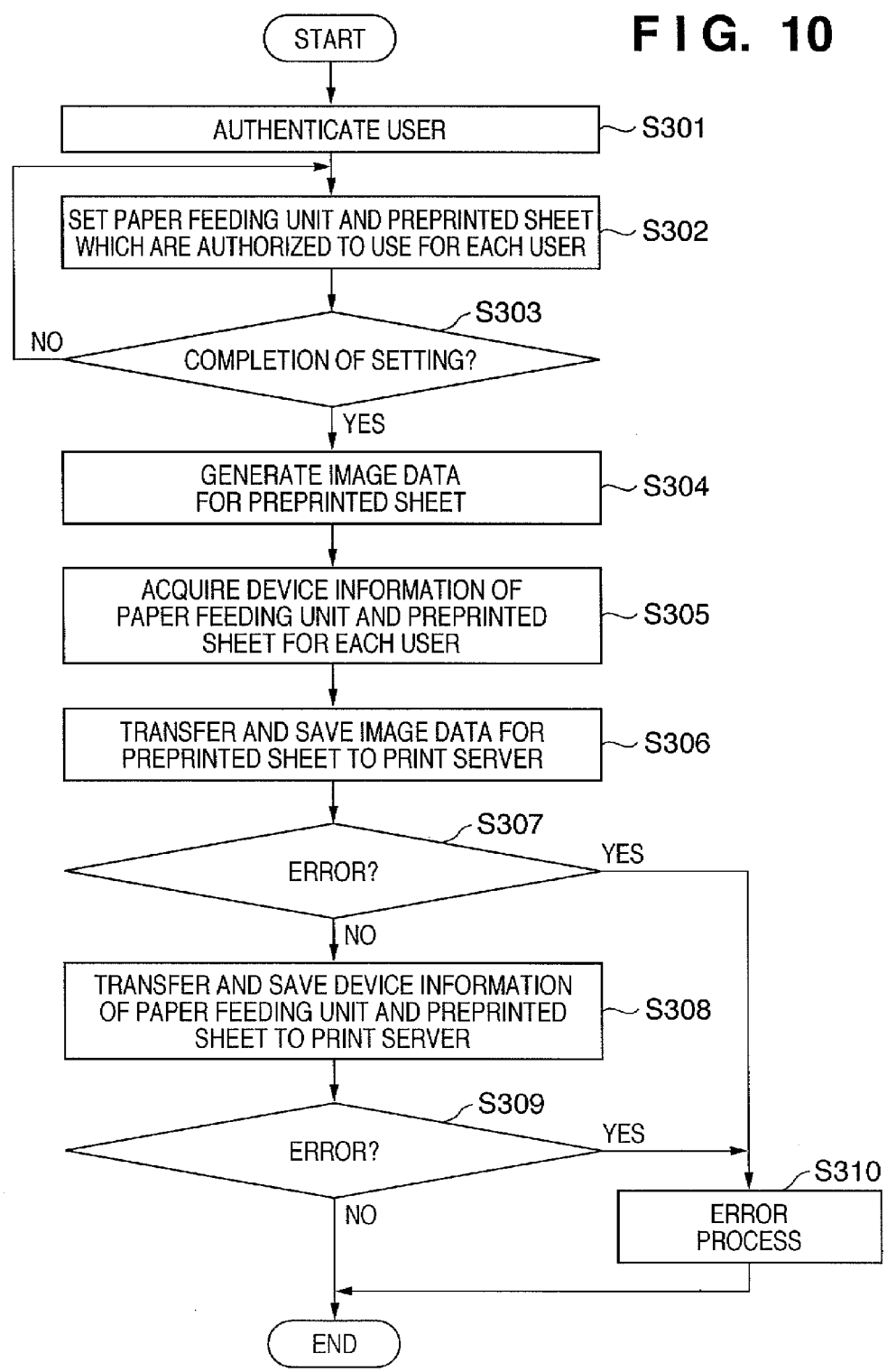
FIG. 10 is a flowchart showing the processing to be executed by a printing system according to the second embodiment of the present invention.

FIG. 10 is a flowchart showing the processing to be executed by the printing system according to the second embodiment of the present invention.

The flowchart shown in FIG. 10 shows the processing that generates image data for preprinted sheets, sets the device names and paper feeding unit names which store preprinted sheets used in overlay print processes for respective users (unit), and transfers and saves (registers) these pieces of information in the print server. A control program that implements this flowchart resides in the client 411 shown in FIG. 5. The processing shown in FIG. 10 is executed when the control program is launched at the time of making required inputs via the display device 416 to implement the respective components in the client 411. Note that the processes in steps S301 to S303 of those shown in FIG. 10 can be implemented by the device (printer 417).

Initially, a system administrator executes user authentication on the device (printer 417) (step S301). After user authentication, the system administrator sets paper feeding units of the device, which are authorized for use upon execution of overlay printing for respective users, and preprinted sheets to be stored in these paper feeding units (step S302). FIG. 11 shows exemplary operation windows used to set, on the device, the paper feeding units of the device, which are authorized for use upon execution of overlay printing for respective users, and preprinted sheets to be stored in the paper feeding units. Note that these operation windows are normally displayed on the display device of the device, but they may be displayed on the display device 416 of the client 411 to which the device is connected, and may be operated on the client.

Especially, an operation window 1201 shown in FIG. 11 is used to set users and user groups, and an operation window 1202 in FIG. 11 is used to set the paper feeding units and preprinted sheets to be stored in the paper feeding units.

The operation window 1201 allows the administrator to add and delete users (members) to groups, to set the name of a group to be created, to delete an existing group, to add users (members), and so forth.

The operation window 1202 allows the administrator to add and delete the paper feeding units available for each group set on the operation window 1202, to execute processing after paper cassettes are exchanged, to designate sheet types that can be stored, to input a sheet name, and so forth.

The device setting information set on the operation windows 1201 and 1202 is stored and registered in the internal memory of the device (printer 417). When the device setting information is set via the client 411, it is registered in the internal memory of the client 411.

Note that processing after paper cassettes are exchanged means processing to be executed by the device when the paper cassettes as the paper feeding units are exchanged. Especially, in the second embodiment, when the paper cassettes are exchanged, either the process for re-registering the paper cassette name of the paper cassette and enabling the print processes or that for disabling all print processes is executed.

When the type of sheets to be stored in the paper cassette is re-registered to enable the print process, a message for prompting the user to re-register the type of sheets is output, and the operation window 1202 is then displayed, thus requesting to execute a re-setting operation. When all the print processes are disabled, a message that advises accordingly is output, and the device setting information set on the operation window 1202 is cleared.

The description will revert to FIG. 10.

The CPU 105 continues the process in step S302 until the setting is completed. Thus, the CPU 105 checks if the setting is complete (step S303). If the setting is not complete yet (NO in step S303), the process returns to step S302. On the other hand, if the setting is complete (YES in step S303), the process advances to step S304.

Next, the CPU 105 generates image data for preprinted sheets used in overlay printing (step S304). The CPU 105 sends an inquiry about the device setting information of the paper feeding units and preprinted sheets available for each user set in step S302, and acquires the device setting information (step S305). FIG. 12 shows an example of device setting information of the paper feeding units and preprinted sheets available for each user. As shown in FIG. 12, with the device setting information, pieces of information such as the user names of users who are authorized to use the device, the paper feeding units and preprinted sheets available for these users, the processing contents upon exchange of the paper feeding units, and the like are managed. Since this device setting information is acquired from the device, it also serves as device information associated with that device.

The CPU 105 then transfers and saves (registers) the image data for preprinted sheets generated in step S304 to the print server 421 (step S306). The CPU 105 checks if an error has occurred in the process in step S306 (step S307). If the CPU 105 determines that an error has occurred (YES in step S307), it executes an error process (step S310).

On the other hand, if the CPU 105 determines that no error has occurred (NO in step S307), it transfers and saves (registers) the device setting information for each user acquired in step S305 to the print server 421 (step S308). The CPU 105 then checks if an error has occurred in the process in step S308 (step S309). If the CPU 105 determines that an error has occurred (YES in step S309), it executes an error process (step S310). On the other hand, if the CPU 105 determines that no error has occurred (NO in step S309), it ends the processing.

With this processing, when the paper cassettes of the device have been illicitly exchanged, all pieces of device setting information of the paper feed units and preprinted sheets which are authorized for use in step S302 are cleared. For this reason, execution of the overlay print process results in an error, and the print process cannot be executed. Also, since the manual insert unit is not authorized for use, printing cannot be executed using the manual insert unit. That is, execution of an illicit overlay print process can be inhibited.

Figure 13:
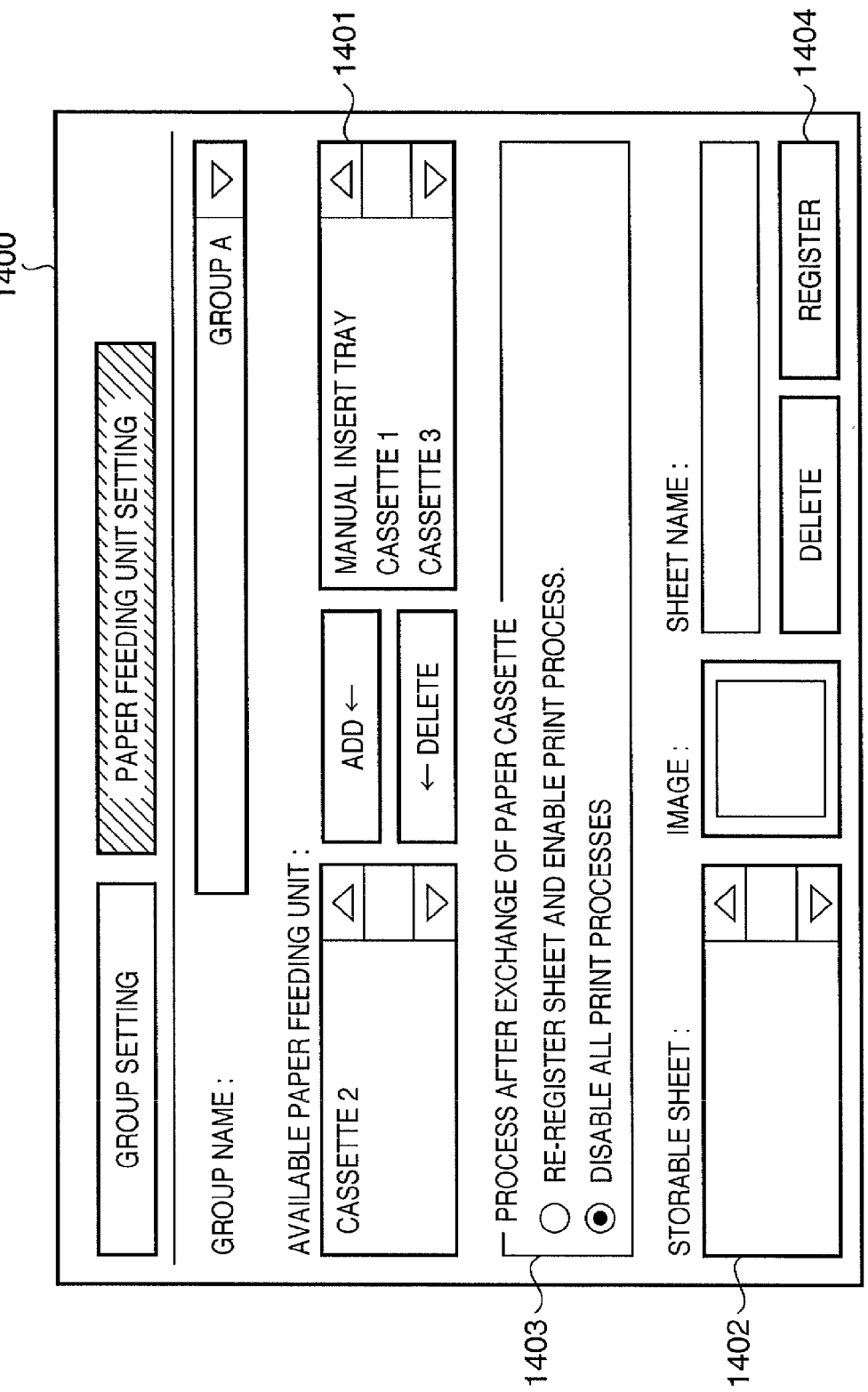
FIG. 13 shows an example of the setting state of paper feeding units and preprinted sheets available for respective users when paper cassettes of a device have been illicitly exchanged according to the second embodiment of the present invention.

In this manner, in either case, illicit printing can be prevented. FIG. 13 shows an example of the setting state of the paper feeding units of the device and preprinted sheets which are authorized for use upon overlay printing when the paper cassettes of the device have been illicitly exchanged.

FIG. 13 shows the contents of an operation window 1400 after settings for preventing illicit printing are made on the operation window 1202 shown in FIG. 11.

On the operation window 1400, a list 1401 indicates a view of paper feeding units which are not set as available paper feeding units. In this case, a manual insert tray, cassette 1, and cassette 3 are set. A list 1402 shows a view of paper sheets which can be stored in the available paper feeding units. In this case, no paper sheets which can be stored are set.

A radio button field 1403 includes controls used to set the processing after the paper cassettes are exchanged. The radio button field 1403 includes 1) an option for reregistering paper sheets to enable a print process, and 2) an option for disabling all print processes. In this case, the option for disabling all print processes is selected.

Upon operation of a "register" button 1404 on this operation window 1400, various setting contents on the operation window 1400 are registered in the internal memory of the device.

As described above, according to the second embodiment, in addition to the effects described in the first embodiment, when the paper cassettes have been illicitly exchanged on the device, the setting information required to execute overlay printing is cleared. As a result, overlay printing using paper sheets which are not under the control of the print server can be prevented from being executed.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user's computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-168084 filed on Jun. 26, 2007, which is hereby incorporated by reference herein in its entirety.

What is claimed is:

1. An information processing apparatus for generating information required to manage an overlay print process which overlays and prints an image on a print sheet on which form contents are printed in advance, the apparatus comprising:

a first transmission unit configured to transmit first image data, including graphical image data, indicating form contents, and setting information associated with a previously stored print sheet on which the form contents are printed in advance to a server, which manages data associated with the overlay print process, for registration by the server, a second transmission unit configured to, when an execution instruction of the overlay print process is received, generate second image data of the image to be overlaid and printed on the print sheet used in the overlay print process, generate associated information indicating association between the second image data and a print attribute designated for the overlay print process that uses the second image data, and transmit the second image data and the association to the server;
an acquisition unit configured to acquire device information of a device which executes the overlay print process, and
a setting unit configured to set setting information associated with a print sheet used in the overlay print process based on the device information acquired by said acquisition unit;
wherein said acquisition unit acquires information including a device name of the device, and a paper feeding unit name of a paper feeding unit of the device as the device information; and
wherein said setting unit sets the setting information including the device name of the device, the paper feeding unit name of the paper feeding unit of the device, and a form name which indicates a type of print sheet stored in the paper feeding unit and corresponds to the first image data.

2. An apparatus according to claim 1, wherein said print attribute is information including device name of a device that executes the overlay print process and a paper feeding unit name of a paper feeding unit of the device.

3. An apparatus according to claim 1, further comprising a first generation unit configured to generate the first image data.

4. An apparatus according to claim 1, wherein said acquisition unit acquires information including a device name of the device and a paper feeding unit name of a paper feeding unit of the device available for a user as the device information.

5. An apparatus according to claim 4, wherein said setting unit sets, for each user, the setting information including the device name of the device, the paper feeding unit name of the paper feeding unit of the device, and a form name which indicates a type of print sheets stored in the paper feeding unit and corresponds to the first image data.

6. An apparatus according to claim 1, further comprising a search unit configured to search for first image data corresponding to the print attribute based on the setting information and the associated information managed by the server, and the print attribute by transmitting a search instruction having the print attribute including the device name and the form name as a search condition.

7. The apparatus according to claim 6, further comprising:
a determination unit configured to determine based on a search history by said search unit whether or not to composite the first image data found by said search unit and the second image data associated with the print attribute in the associated information;
a composition unit configured to, when said determination unit determines that the first image data and the second image data are to be composited, compose the first image data and the second image data to generate third image data; and
an output unit configured to output the third image data generated by said composition unit.

8. An apparatus according to claim 1, wherein the device comprises:
an input unit configured to input device setting information including a user name of a user who is authorized to use the device, a paper feeding unit name of a paper feeding unit of the device available to the user, and processing contents to be executed when a paper feeding unit is exchanged; and
an execution unit configured to, when the paper feeding unit is exchanged, execute a process indicated by the processing contents set in the device setting information.

9. An apparatus according to claim 8, wherein the processing contents indicate one of a process for re-registering a paper feeding unit name of a paper feeding unit which stores a print sheet to enable a print process and a process for disabling all print processes.

10. A method of controlling an information processing apparatus for generating information required to manage an overlay print process which overlays and prints an image on a print sheet on which form contents are printed in advance, the method comprising:
a first transmission step of transmitting first image data, including graphical image data, indicating form contents and setting information associated with a previously stored print sheet on which the form contents are printed in advance to a server, which manages data associated with the overlay print process, for registration by the server;
a second transmission step, when an execution instruction of the overlay print process is received, of generating second image data of the image to be overlaid and printed on the print sheet used in the overlay print process, of generating associated information indicating association between the second image data and a print attribute designated for the overlay print process that uses the second image data, and of transmitting the second image data and the association to the server;
an acquisition step of acquiring device information of a device which executes the overlay print process, and
a setting step of setting information associated with a print sheet used in the overlay print process based on the device information acquired in said acquisition step,
wherein said acquisition step acquires information including a device name of the device, and a paper feeding unit name of a paper feeding unit of the device as the device information, and
wherein said setting step sets the setting information including the device name of the device, the paper feeding unit name of the paper feeding unit of the device, and a form name which indicates a type of print sheet stored in the paper feeding unit and corresponds to the first image data.

11. A non-transitory computer-readable storage medium including a program which, when executed on a computer in an information processing apparatus, causes the information processing apparatus to perform a method of controlling an information processing apparatus for generating information required to manage an overlay print process which overlays and prints an image on a print sheet on which form contents are printed in advance, the method comprising:
a first transmission step of transmitting first image data, including graphical image data, indicating form contents and setting information associated with a previously stored print sheet on which the form contents are printed in advance to a server, which manages data associated with the overlay print process, for registration by the server;

a second transmission step, when an execution instruction of the overlay print process is received, of generating second image data of the image to be overlaid and printed on the print sheet used in the overlay print process, of generating associated information indicating association between the second image data and a print attribute designated for the overlay print process that uses the second image data, and of transmitting the second image data and the association to the server;

an acquisition step of acquiring device information of a device which executes the overlay print process, and a setting step of setting information associated with a print sheet used in the overlay print process based on the device information acquired in said acquisition step, wherein said acquisition step acquires information including a device name of the device, and a paper feeding unit name of a paper feeding unit of the device as the device information, and wherein said setting step sets the setting information including the device name of the device, the paper feeding unit name of the paper feeding unit of the device, and a form name which indicates a type of print sheet stored in the paper feeding unit and corresponds to the first image data.

* * * * *